E. W. WESCOTT.
ORE TREATMENT.
APPLICATION FILED JAN. 5, 1920.
1,406,595.
Patented Feb. 14, 1922.
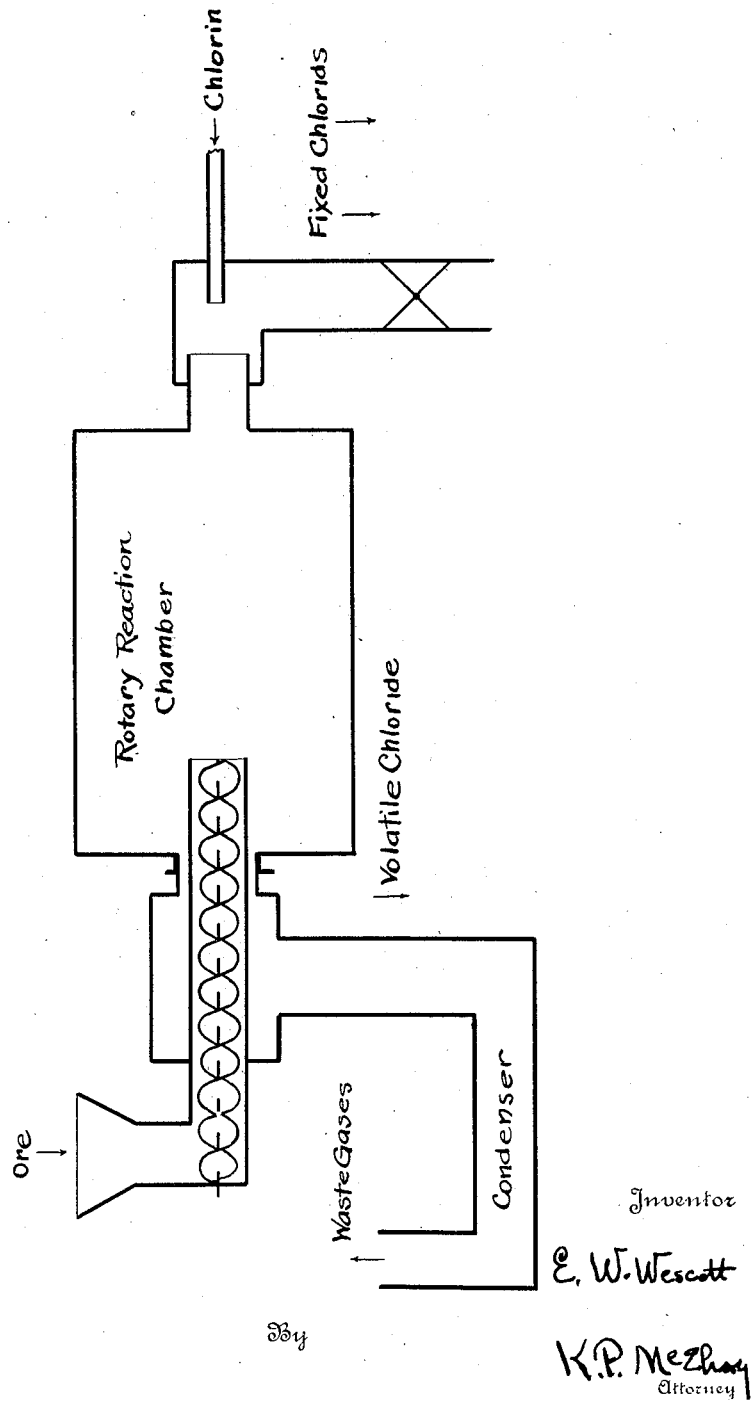

UNITED STATES PATENT OFFICE.

ERNEST W. WESCOTT, OF NIAGARA FALLS, NEW YORK, ASSIGNOR TO KALMUS, COMSTOCK & WESCOTT, INCORPORATED, OF BOSTON, MASSACHUSETTS, A CORPORATION OF MASSACHUSETTS.

ORE TREATMENT.

1,406,595.   Specification of Letters Patent.   Patented Feb. 14, 1922.

Application filed January 5, 1920. Serial No. 349,578.

*To all whom it may concern:*

Be it known that I, ERNEST W. WESCOTT, a citizen of the United States of America, and a resident of Niagara Falls, New York, have invented certain Improvements in Ore Treatment, of which the following is a specification.

This invention relates to the treatment of ores; a l it comprises a method of recovering the valuable constituents of certain arseni.al cobalt and nickel ores, such as the cobalt ores from the cobalt district of Canada, and of speiss, arsenical concentrates, etc. containing cobalt or nickel, or cobalt and nickel, together with more or less silver, copper, etc. with iron as an impurity wherein the ore is exposed to dry chlorin and heat at a sufficient temperature to form and volatilize arsenious and ferric chlorids, the temperature being, however, insufficient to permit any substantial volatilization of nickel and cobalt chlorids and such temperature being advantageously in the neighborhood of 500° to 550° C., volatilized chlorids being condensed and removed by cooling the effluent gases, while the treated ore is cooled and leached, or extracted to recover cobalt and nickel chlorids and silver if present; all as more fully hereinafter set forth and as claimed.

It is an object of the present invention to provide a simple and economical preparatory or preliminary method or step of treatment applicable to refractory arsenical ores and materials containing cobalt or nickel, or both, together with other values, such as silver, copper, etc., and impurities such as iron, to prepare them for wet treatment and final purification and separation of the contained values. By this step is affected a partial separation of impurities and values, such values being rendered soluble in water or diluted acid or (in the case of silver) being rendered available.

Certain cobalt ores, and particularly those from the cobalt district, Ontario, carry this metal as arsenid. These ores usually contain more or less nickel or silver, or both, and often in proportions rendering their extraction worth while. Similarly arsenical nickel ores often carry cobalt, copper, etc. Iron is always present in such ores, as an impurity, or as a subtantial component. These ores are difficult to handle by ordinary metallurgical methods in any cheap, easy and simple way. Sometimes the values are concentrated into a speiss, which, however, is nearly as hard to handle as the original ore. The difficulties in smelting and wet methods of course arise largely from the presence of arsenic but in some measure they are due to the presence of iron which is hard to separate from the recovered cobalt and nickel in any inexpensive way. Efficient recovery of silver or copper, or both, also presents difficulties.

In the present invention I treat these ores, or their concentrates, or speisses made therefrom, with dry chlorin as free from air as is practicable. The ore, or ore preparation should be fine ground; the finer the better. I prefer to have it so that at least 95 per cent. will pass a 100 mesh sieve.

The action of the chlorin on these ores is highly exothermic; much heat being developed; and the action may become violent. For this reason it is desirable that contact be on the counter-current principle; fresh chlorine meeting nearly exhausted ore while the fresh ore meets chlorin much diluted with the vapors produced (arsenious chlorid). In so operating it is easy to establish a temperature control—which is here important; and the chlorin can be completely, or substantially completely utilized and the ore thoroughly chlorinated. Any convenient type of apparatus on the counter-current principle, that is one in which a moving column or body of material advances against a stream of gas (chlorin) may be used, such as rotary kilns of the cement kiln type, shaft and shelf furnaces, cylindrical conduits provided with a conveyer, etc. etc. With the use of fairly rich ore no heating means are necessary since the reaction can be made to take care of itself in this respect. On the whole I find that some type of rotary kiln with refractory lining, substantially sealed against access of air or leakage of vapors, is best. No pressure is necessary and on the other hand I find it better to operate with a slight degree of suction or vacuum; not enough to cause inward leakage of air to any substantial extent but enough to prevent outward passage of chlorin or vapors of arsenious chlorid.

In the accompanying illustration I have shown diagrammatically in the manner of a flow sheet, the present operation. The flow sheet carries legends showing the course of materials.

As stated the chlorinating reaction evolves much heat; and with a rich ore or concentrate or speiss there may be enough heat developed to raise the temperature of the ore mass to an undesired extent, although this of course is a matter depending largely upon the type of apparatus used, its size and similar considerations. For convenience in operation it is better to adjust the conditions so that the heat evolution as balanced against radiation losses, heat carried away in effluent vapors and discharged solids, etc., shall be sufficient to maintain the materials at the temperature desired. While outside heating can be employed, and in somes cases its use may be desirable, ordinarily I find it more convenient to dispense with it. With some ores and some apparatus, cooling means or other means of controlling temperatures may be provided. Cooling is more often necessary than heating.

If the evolution of heat with a given ore, a given apparatus and a given rate of feed is too great, it is possible to dilute the chlorin somewhat with inert gases, such as oxygen-free products of combustion or with vapors, such as the vapors of arsenious chlorid arising from the reaction. But in such a case of undue development of heat it is ordinarily more convenient to moderate the reaction by, so to speak, diluting the ore itself; by blending the richer ore with poorer ores or with inert materials. As such an inert material the exhausted tailings coming from the final operations hereinafter described are desirable since they import nothing foreign into the reaction chamber to interfere with the reactions therein.

I do not desire the reaction material to reach a temperature during chlorination of more than, say, 600° C. or (ordinarily) less than, say 400° C. While temperatures lower than 400° C. may be used in the present invention, the operation becomes quite slow. Between 400° C. and 600° C. the arsenic and the iron volatilize as chlorids, while nickel, cobalt and silver do not. Nickel chlorid is somewhat more volatile than cobalt chlorid, but I find that below, say, 625° to 650° C., there is no substantial volatilization of even nickel chlorid. Of course if some loss of nickel or cobalt is not important the temperatures may be carried higher than 600° C., say up to 850° C., or higher. But ordinarily it is best to avoid temperatures materially above 600° C., not only for the stated reason but to avoid sintering, etc.

Ores of this character always contain iron. This iron readily goes over into ferric chlorid but although pure ferric chlorid is fairly volatile around 300° C., I find that in practice in order to get a good extraction of iron from ores it is best to have the temperature not lower than about 450° C. I can operate conveniently, in the case of some ores, as low as 400° or 425° C., but 450° is better. Any temperature between 450° or 500° C. and 600° C. is suitable for the present purpose, but temperatures in the range lying between 500° and 550° C. are best.

The effluent gases, with proper operation, are substantially free of free chlorin and carry arsenious chlorid and ferric chlorid. If any sulfur or antimony is present in the ores their chlorids may also be present. On cooling the vapors condense to give ferric chlorid and liquid arsenious chlorid, the former being, partly at least, in solution. If much iron is present, some of the ferric chlorid may separate in the solid form. The chlorid of arsenic and the chlorid of iron in this condensate may be separated from each other by distillation or in other suitable ways. Any dust of unchanged ore or volatilized nickel or cobalt chlorids which may go over with the vapors may be recovered from the distillation residues.

After chlorination the ore is substantially free of arsenic and carries but little iron. If the chlorination has been conducted around 450° C. or below, the amount of residual iron is greater than if the temperature has been carried to 550° C. or 600° C. If the chlorin contains air the amount of residual iron is greater than if air-free chlorin has been used, some of the iron being oxidized into non-volatile forms. The presence of air or oxygen in the chlorin used has some other inconveniences. One is the production of more or less arsenious oxid which goes forward with the vapors of chlorid and another is a greater development of heat with, at times, caking or sintering. "Cell gas" from carefully operated electrolytic chlorin-caustic cells is usually pure enough however.

The calcines are delivered as a fine, dry powder containing a large percentage of soluble matter, cobalt chlorid, nickel chlorid, copper chlorid, etc. Any silver which may be present occurs as insoluble but available chlorid in the insoluble residue of silica, gangue minerals, etc. The calcines may be treated with a little water—merely enough to form a hot saturated solution of chlorids. In this event the silver chlorid will be dissolved by the solution of nickel and cobalt chlorids and may be so separated from the gangue. The solution of chlorid of cobalt or nickel may then be diluted to cause a separation of silver chlorid. I find it, however, better to use a greater proportion of water in leaching the calcines, thereby leaving the silver undissolved. I add the desired amount of water, press and wash, and afterward extract the silver from the press cakes. If about 8 parts of water or more are used for each part of soluble chlorid no substantial amount of silver goes into solution. The dissolved chlorids (cobalt, nickel, copper, etc.) may be recovered and separated in any desired way. The washed calcines may be leached with any convenient reagent which will dissolve silver chlorid, such as sodium thiosulfate or cyanid. With fine ground, well treated ore the tailings remaining after extraction of the silver contain so little of value that they may be discarded. If it is desirable to dilute unduly rich ore in chlorination some of the dried tailings may be used for this purpose.

In a modification of my invention I may conduct the chlorination in a plurality of stages so as to remove, first the arsenic and later the iron. In so doing, I chlorinate for a time at a temperature not exceeding, say, 250° C. In so doing nearly all of the arsenic volatilizes as arsenious chlorid, leaving most of the iron behind. The arsenic chlorid may be condensed and removed and disposed of in any suitable way. On now raising the temperature of the material while continuing the flow of chlorin, ferric chlorid practically free of arsenic, etc., distils over and may be condensed. I regard it, however, as better to conduct the whole operation at a high temperature and take off the arsenic and iron together as chlorids, separating the two chlorids subsequently.

What I claim is—

1. The process of treating arsenical cobalt or nickel ores containing iron, which comprises treating such an ore in a finely divided condition with a current of chlorin, at a temperature not above 600° C. and removing the vapors of chlorids of arsenic and iron produced.

2. The process of treating rich arsenical cobalt or nickel ores containing iron and silver, which comprises treating such an ore in a finely divided condition with a current of chlorin, under temperature controlled conditions, the self developed temperature being maintained at such a point as will permit volatilization of arsenic and iron as chlorids while not permitting volatilization of chlorids of cobalt, nickel and silver.

3. The process of treating arsenical cobalt and nickel ores containing iron, which comprises treating such an ore in a finely divided condition with a current of chlorin at a temperature between 425° and 600° C. and condensing and collecting the volatilized chlorids formed.

4. The process of treating arsenical cobalt and nickel ores containing iron which comprises treating such an ore in a finely divided condition with a current of chlorin, at a temperature between 450° and 600° C.

5. The process of treating arsenical cobalt and nickel ores containing iron which comprises treating such an ore in a finely divided condition with a current of chlorin, at a temperature between 500° and 550° C.

6. The process of treating arsenical cobalt and nickel ores, containing iron and other impurities which comprises exposing such an ore to a current of dry chlorin for a sufficient length of time and at a sufficient temperature to volatilize and expel the arsenic as chlorin and to convert the iron into ferric chlorin, while not volatilizing cobalt and other chlorids which are formed.

7. The process of treating arsenical cobalt and nickel ores containing iron and other impurities which comprises exposing such an ore to a current of dry chlorin for a sufficient length of time and at a sufficient temperature to volatilize and expel the arsenic as chlorid and to convert the iron into ferric chlorid and volatilize the same, while not volatilizing cobalt and other chlorids which are formed.

8. The process of treating arsenical ores containing cobalt, nickel and silver for removal of arsenic therefrom with dry chlorin gas wherein the necessary heat for reaction is generated and maintained by the exothermic heat of the reaction itself.

9. In the treatment of cobalt ores rich in arsenic with the aid of gaseous chlorin, the process which comprises blending such an ore with sufficient inert material to prevent a rise in temperature above 600° C.

In testimony whereof I have signed this specification.

ERNEST W. WESCOTT.